Nov. 12, 1963 C. F. TAYLOR ETAL 3,110,180
FREQUENCY COMPENSATED MASS FLOWMETER
Filed March 19, 1959 3 Sheets-Sheet 1
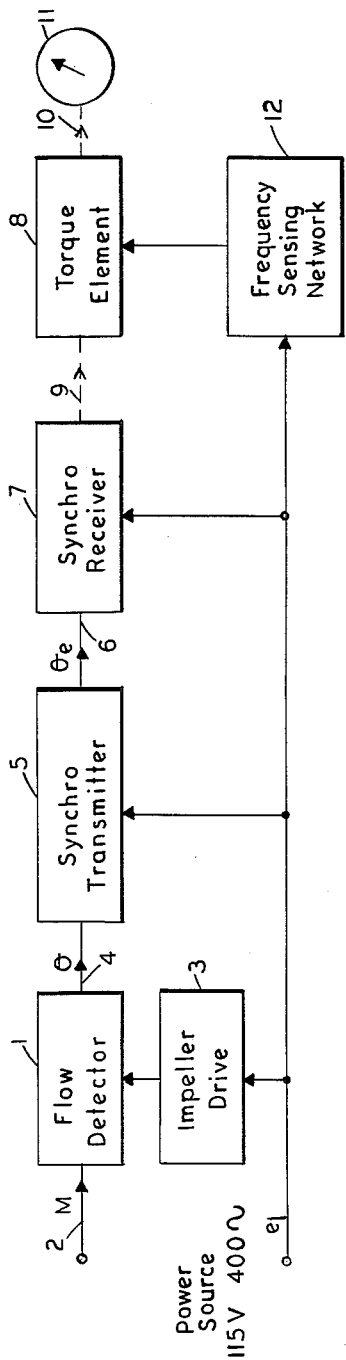
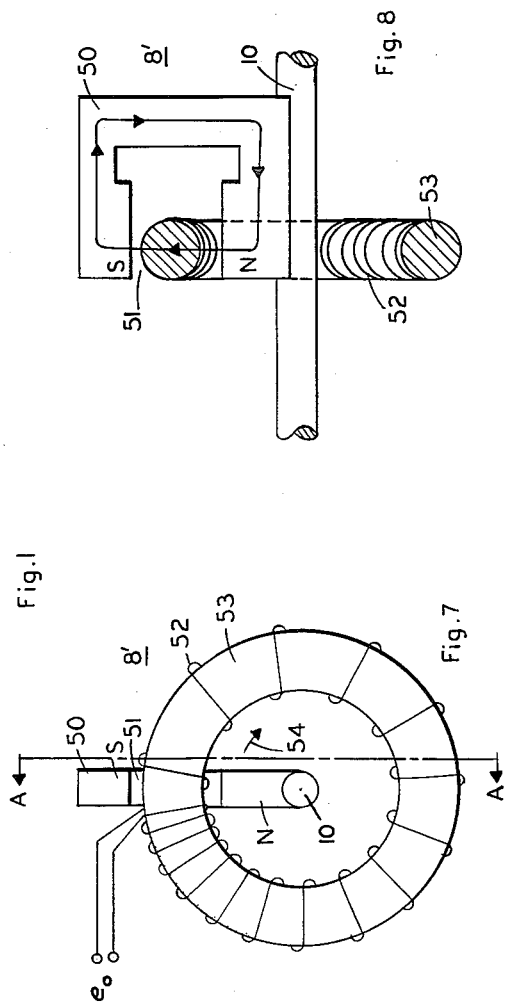
INVENTORS
Clement F. Taylor
John R. Macintyre
BY Henry D. Oakley
Irving M. Freedman
Their Attorney Nov. 12, 1963  C. F. TAYLOR ETAL  3,110,180
FREQUENCY COMPENSATED MASS FLOWMETER
Filed March 19, 1959  3 Sheets-Sheet 2

INVENTORS
Clement F. Taylor
BY  John R. Macintyre
Henry D. Oakley

Irving M. Freedman
Their Attorney

Nov. 12, 1963  C. F. TAYLOR ETAL  3,110,180
FREQUENCY COMPENSATED MASS FLOWMETER
Filed March 19, 1959  3 Sheets-Sheet 3

INVENTORS
Clement F. Taylor
John R. Macintyre
BY Henry D. Oakley

Irving M. Freedman
Their Attorney

United States Patent Office 3,110,180
Patented Nov. 12, 1963

3,110,180
FREQUENCY COMPENSATED MASS
FLOWMETER
Clement F. Taylor, Lynn, John R. Macintyre, Peabody, and Henry D. Oakley, Lynn, Mass., assignors to General Electric Company, a corporation of New York
Filed Mar. 19, 1959, Ser. No. 800,599
14 Claims. (Cl. 73—194)

This invention relates to the minimizing of errors in a mass flowmeter system and in particular, to an arrangement for use with a flowmeter to compensate for errors which result from deviations of the impeller speed of rotation from the nominal speed at which the system indicator has been calibrated.

Accurate measurement and control of fluid flow with reference to mass may be advantageously performed with apparatus utilizing angular momentum phenomena. In such apparatus, the measured fluid is accelerated to a uniform linear speed about a given axis by a fluid impeller rotated about that axis at a constant speed. Measurements representative of the power required for such acceleration or representative of the power lost in predetermined deceleration of the fluid after it has been so accelerated is used as an indication of mass flow characteristics. However, the electrical position signal produced by such mass flowmeters is proportional not only to the mass flow rate but to the impeller speed of rotation. In other words, the indicator scale readings will be accurate only at the impeller speed at which the scale was calibrated and deviations from such speed will result in indicator errors. It is common practice to drive the impeller of such a flowmeter from a synchronous electric motor. In such installations, the frequency of the power system may vary sufficiently to cause variations of motor speed and thus errors of mass flow indications through variations of impeller speed. Similarly, many "constant" speed impeller drive arrangements have speed variations of ±1% or more, introducing indicator errors.

It is an object of the present invention to provide an improved mass flow measurement apparatus wherein effects of impeller speed variations from a nominal speed are automatically compensated for.

Another object of the invention is to provide an improved arrangement for developing and utilizing the speed compensating signal in mass flowmeter measurement apparatus.

Yet another object of this invention is to provide an improved arrangement for compensating the mass flow signal for impeller speed deviations at the indicator motive means through use of a magnetic torque arrangement.

Further objects and advantages of the invention will become apparent as the following description proceeds and the features of novelty which characterize the invention will be pointed out with particularity in the claims annexed to and forming a part of this specification.

In accordance with one form of the invention, a fluid mass rate of flow measuring device of the type having motive means driving the fluid through a flow detector is provided with a remote position telemetering arrangement to position an indicator in accordance with the angular response of the mass rate of flow sensing means. The telemetering arrangement is connected through a resilient coupling to the indicator pointer shaft.

The indicator pointer shaft includes a member deflected therewith and linked magnetically with a coil which develops a magnetic speed compensating torque on the shaft in accordance with a speed deviation signal applied to the coil. The speed deviation signal is, in turn, provided by a speed responsive circuit which produces an electric signal the magnitude and phase of which varies as the magnitude and direction, respectively, of the impeller speed deviations from a predetermined speed at which the indicator is calibrated. The indicator reading is thus compensated to avoid errors which would otherwise occur because of impeller speed deviations.

For a better understanding of this invention, reference may be had to the following description taken in connection with the accompanying drawings, in which:

FIG. 1 is a schematic representation in block diagram form of a mass flowmeter system embodying the subject invention;

FIG. 7 illustrates a direct current torque element suitable for use in the system of FIG. 1;

FIG. 8 is a cross-sectional side view of the torque element of FIG. 7, taken along line AA in the direction of the arrows.

Figure 2:
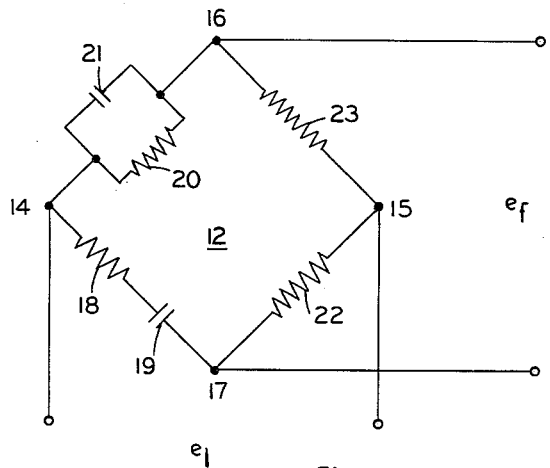
FIG. 2 is a schematic diagram of the frequency sensing network of FIG. 1.

Referring to FIG. 1, the fluid M to be measured passes through flowmeter or flow detector 1 via fluid conduit 2. In the flow detector 1 angular momentum proportional to line frequency is imparted to each unit mass of fuel by an impeller (not shown) driven by the impeller drive synchronous motor 3. By suitable means well known in the art, such as by recovering the angular momentum, a mechanical torque is developed proportional to the product of mass flow rate and line frequency.

The operation and general construction of the flow detector 1 is explained in more detail in the copending patent application, Serial No. 797,177, filed March 4, 1959, now Patent No. 3,084,544, in the name of Clement F. Taylor, and assigned to the same assignee as the subject invention.

The mechanical deflection $\theta$ of flow detector 1 caused by the fluid flow M is coupled by shaft 4 to the rotor (not shown) of synchro transmitter 5 which is excited from the power source line frequency to produce an electrical signal $\theta_e$ at the stator (not shown) representing a shaft rotation or angular deflection $\theta$ proportional to the product of mass flow rate and frequency.

The flow detector 1, impeller drive 3, and synchro transmitter 5 may be conveniently packaged in a single unit located at the fuel flow line while the remainder of the system may be physically located remote therefrom and contained within a second unit.

The electrical signal $\theta_e$ developed by the stator winding (not shown) of synchro transmitter 5 is connected via cable 6 to the stator winding of synchro receiver 7. The rotor (not shown) of synchro receiver 7 is connected to the line voltage $e_1$ so that the synchro receiver 7 repeats accurately the position of the synchro transmitter 5. For a more complete description of the theory of synchro construction and operation reference may be had to Section 59(a) of the publication "Radar System Fundamentals" (NAVSHIPS 900,017) published by the Bureau of Ships, Navy Dept., in April 1944.

The rotor of synchro receiver 7 is mechanically coupled to torque element 8 by shaft 9 to produce a rotation of indicator shaft or drive connection 10 proportional to the product of mass flow rate and frequency. The arrangement described thus far is a synchro positioning system to position the shaft 10 in accordance with the angular deflection $\theta$ of flow detector 1.

The torque exerted on the rotor of synchro receiver 7 is proportional to the sine of the angle between the axis of the field induced by the signal $\theta_e$ and the magnetic axis of the rotor. However, since the entire range of operation of the subject system is confined to relatively small angular deflections, the sine curve approximates a straight line and the torque versus deflection characteristic is substantially linear. Therefore, non-linearities are not introduced by the synchro torque characteristic.

An indicator 11 is coupled to shaft 10 and is calibrated in mass flow rate at the nominal line frequency which is shown in FIG. 1 as 400 cycles. Since the pointer deflection of indicator 11 is proportional to the products of mass flow rate and frequency, indications at frequencies other than nominal will be in error an amount proportional to the line frequency deviation from nominal. The above discussion is in terms of line frequency deviations since the line frequency of the disclosed system determines the speed of synchronous impeller drive motor 3 driving the impeller of flowmeter 1. However, it should be appreciated that the subject invention can be utilized with any type of impeller drive by deriving an electrical signal from the impeller drive system which is proportional to the speed of the impeller. This may be conveniently accomplished through use of a tachometer generator coupled to the impeller drive. Therefore, for purposes of the subject discussion, line frequency deviations may be equated to impeller speed deviations.

In order to compensate for variations of line frequency, a compensating electrical signal is developed by frequency sensing network or detector 12 to produce a compensating torque in torque element 8 to modify and correct the mass flow rates of indicator 11.

FIG. 2 shows a suitable frequency sensing network 12, although the network could be of the type disclosed in the aforesaid Taylor application. Referring to FIG. 2, the line voltage $e_1$ is applied to opposite junctions 14 and 15 of the bridge circuit which is of the general type referred to as Wien bridge. In accordance with the operation of a Wien bridge, and as set forth in detail in Section 10–4 of the text book "Basic Electrical Measurements," by Melville B. Stout, published by Prentice-Hall, Inc. of New York in 1950, the bridge will balance at a particular frequency. The frequency at which the bridge will balance is determined by the components thereof and is made to be the nominal line frequency. The output voltage $e_f$ appearing across the remaining bridge junctions 16 and 17, is an alternating signal of a magnitude proportional to the frequency deviation from nominal that reverses phase as the frequency passes through the nominal frequency. One of the bridge arms comprises the resistor 18 and capacitor 19 connected in series and the adjacent bridge arm connected to junction 14 comprises resistor 20 and capacitor 21 connected in parallel. When resistors 18 and 20 are of equal magnitude and the arm opposite the parallel combination comprises a resistor 22 having a resistance twice that of resistor 23 in the remaining arm, the output compensating signal $e_f$ may be conveniently represented by the following relationship:

$$e_f = e_1 \sqrt{2} \frac{R_{23}}{R_{18}} \frac{(f - f_0)}{f_0}$$

where:

$f$ = line frequency.
$f_0$ = nominal frequency (400 c.p.s.).

Figure 3:
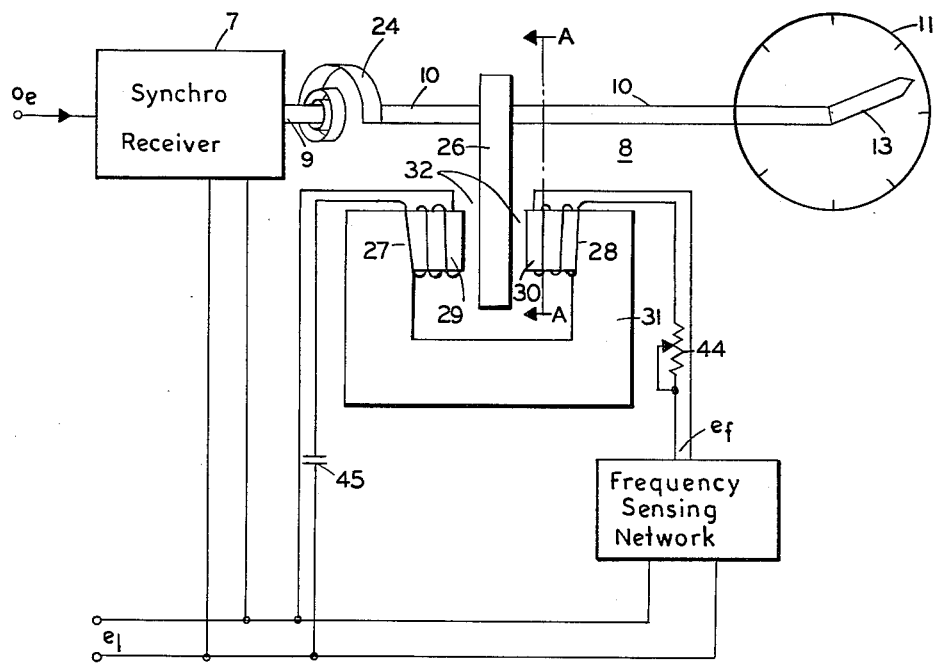
FIG. 3 is a schematic representation of a torque element useful in the system of FIG. 1.

The torque element 8, which converts compensating signal $e_f$ to a compensating torque is shown in more detail in FIG. 3. Referring to FIG. 3, the synchro receiver 7 is coupled through resilient coupling or spring 24 and drive shaft 10 to the pointer 13 of indicator 11 to produce an angular deflection proportional to that of the flow detector 1. Electrically conductive rotor disk 26 is rigidly mounted on shaft 10 for deflection therewith and links the magnetic field produced by current flow in the coils 27 and 28 mounted on opposite sides of the disk 26. Coils 27 and 28 are wound on legs 29 and 30 of the high permeability magnetic member 31 which surrounds disk 26 and form an air gap 32 in which the disk deflects. Coil 27 is a reference coil energized by the line voltage $e_1$ through capacitor 45 to produce a current flow therein proportional ot line voltage, while coil 28 is a control coil energized by the compensating voltage $e_f$ to produce a current flow therein in accordance with the frequency deviation. The magnetic fields produced by the coils 27 and 28 provide a resultant magnetic field which has a component that appears to move in a tangential direction through the air gap, that is at right angles to the axis of rotation of shaft 10 and to a radius drawn from that axis. The magnitude of this moving magnetic field component is proportional to the compensating signal $e_f$ across the control coil, and the resultant compensating torque exerted on the disk 26 and shaft 10 is therefore proportional to the deviation of line frequency from nominal. The torque is produced by the interaction of the magnetic fluxes in the air gap 32 and the eddy currents in the disk 26.

The coupling spring 24 is interposed between the rotor output shaft 9 of synchro receiver 7 and the indicator drive shaft or mechanical drive connection 10 in order to make the torque developed by the synchro receiver of the same order of magnitude as that of the torque element 8. Otherwise the torque developed by synchro receiver 7 may be so large as to require a compensating torque greater than the capabilities of torque element 8 without power amplification. Also, such as arrangement enables the direct application of the compensating torque to the indicator drive shaft 10 independent of the torque gradient of the synchro receiver 7. It is also possible to use known electrical instrument techniques to enable selective adjustment of the spring parameters.

Figure 4:
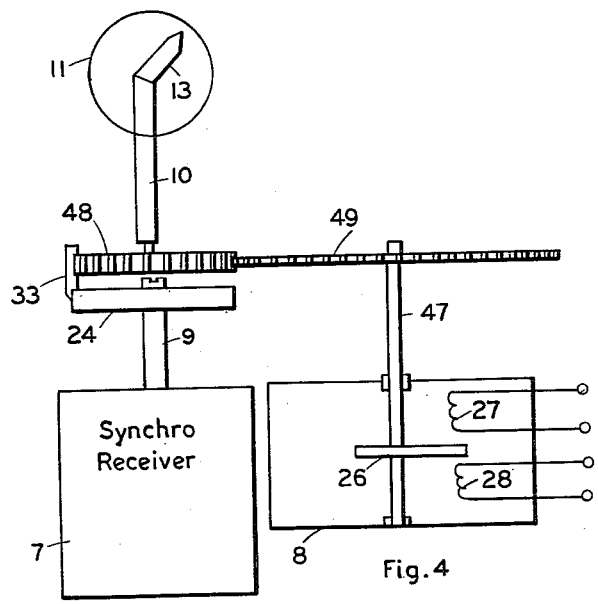
FIG. 4 illustrates an alternative torque element coupling arrangement.

An alternate torque element coupling arrangement is shown in FIG. 4. Referring to FIG. 4, the synchro receiver rotor shaft 9 is axially aligned with but spaced from indicator shaft 10 and spiral spring 24 has its inner end secured to shaft 9. The outer end of spring 24 is secured through connecting member 33 to gear 48. The torque element 8 shown schematically and including conductive rotatable disk 26 may then be constructed as an integral unit and the shaft 47 supporting the disk is coupled to gear 48 through connecting gear 49.

The electrically conductive disk 26 is made of zero temperature coefficient material and is shaped such that as the disk rotates in the direction corresponding to increasing flow rate a continuously varying area is exposed to the magnetic field of the stator to produce a torque that is proportional to mass flow rate. The shaping of the disk 26 is shown in detail in FIG. 6, hereinafter described.

Figure 6:
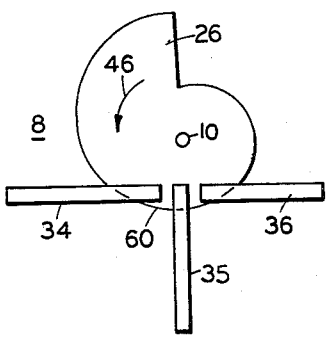
FIG. 6 is the top view of the torque element shown in FIG. 4 and illustrates the coil placement relative to the conductive disk.
Figure 5:
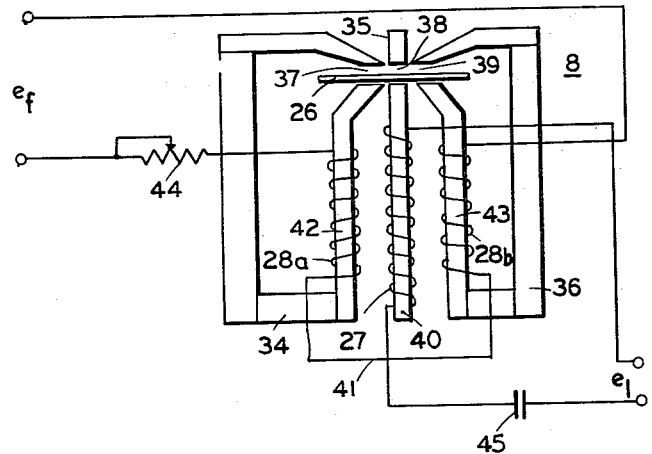
FIG. 5 illustrates the preferred embodiment of the torque element of FIG. 1.

The arrangement of the reference coil 27 and control coil 28 in the torque element 8 of FIG. 3 will produce an unwanted torque when the frequency deviation and hence the current flow in the control coil 28 are zero since there is current flow in the reference coil under all operating conditions. A preferred arrangement of coils 27 and 28 relative to the conductive disk 26 is shown in FIGS. 5 and 6. Referring to FIGS. 5 and 6, it will be seen that the general magnetic configuration is similar to that of an induction watthour meter. Magnetic cores 34, 35 and 36 are constructed of laminated silicon steel and form closed magnetic circuits having end portions above and below the disk 26 and forming air gaps in which the disk may rotate. The air gaps 37, 38 and 39 respectively, are perpendicular to the disk 26 and extend in a direction parallel to shaft 10. Magnetic core 35 has a leg 40 below disk 26 which extends parallel to the shaft 10 with reference coil 27 being wound about the leg. Control coil 28 is in two portions electrically connected in series through lead 41 with one half or portion 28a wound upon leg 42 of magnetic core 34 and the other half or portion 28b wound upon leg 43 of magnetic core 36. The legs 40, 42, and 43 are contiguous to one another and the magnetic cores 34, 35 and 36 are positioned such that air gaps 37, 38 and 39 are displaced from shaft 10 and in the region of the circumferential edge 60 of disk 26 at low flow rates. As best illustrated by FIG. 6, the magnetic member 35 extends in a radial direction from shaft 10 while magnetic members 34 and 36 are perpendicular to and on opposite sides of member 35 and extend generally in a tangential direction to disk 26.

Disk 26 is rigidly fastened to shaft 10 and deflects within the air gaps 37, 38 and 39 to provide a compensating torque in accordance with the signal $e_f$. When the frequency deviation of the line frequency from nominal is zero, that is the line frequency is 400 cycles per second, no compensation torque is required. No torque will be produced by the compensating coils 28a and 28b due to $e_f$ since $e_f$ is zero at the nominal frequency. The torque set up by current flow in reference coil 27 will be in a radial direction and no resultant rotational torque upon shaft 10 will be produced thereby. The torques produced by the voltages induced in coils 28a and 28b by coil 27 will have no effect upon the shaft 10 since the coils are symmetrical and connected such that the fluxes produced through mutual inductance balance one another.

Since $e_f$ is proportional both in magnitude and phase to the frequency deviation, the resultant current flow in coils 28a and 28b is similarly related to the frequency deviation. The fluxes produced by coils 28a and 28b in combination with the flux produced by reference coil 27 produces an angular deflection of disk 26 to compensate the indicator 11 in accordance with the frequency deviation. Variable resistor 44 in series with coils 28a and 28b enables selective adjustment of the compensating effect and is adjusted at the time of calibration of indicator 11.

Capacitor 45 in series with the reference coil 27 reduces the volt amperes drawn from the supply line $e_1$ and may conveniently have a positive temperature coefficient to compensate for temperature effects of the system. In addition, the current variations which result in the reference coil 27 with variations of line frequency because of capacitor 45 compensate for variations of current flow in the control coils 28a and 28b due to variations of line frequency.

The direction of rotation of disk 26 for increasing flow rate is indicated by the arrow 46 in FIG. 6. If disk 26 were to have a circular shape, the compensating torque produced for a given frequency deviation would be the same for all angular positions of the disk. In order to have the compensating torque proportional to scale position, the disk 26 is made in the shape of a cam that extends furthest into the air gap at the full scale position of indicator 11 and extends the least into the air gap at the zero position. The correcting torque is thus made not only proportional to the frequency deviation but also proportional to the scale position of the indicator. The torque required to correct for a given frequency deviation is proportional to the scale position for a given frequency deviation since less torque is required, for example, to correct for a given frequency deviation at half scale position than is required at full scale position. Relating torque to scale position is not necessary if the flow rate of a particular system varies within a comparatively narrow range.

During operation, if the line frequency is the nominal frequency of 400 cycles per second, the frequency compensating voltage $e_f$ is zero and the torque element 8 exerts no torque on the shaft 10 and no compensation is applied to indicator 11. If the frequency should decrease, for example to 380 cycles, the position of indicator pointer 13 without compensation would be approximately 5% too low. However, the torque element 8 exerts a torque on shaft 10 to urge the pointer 13 to the position it would be if the line frequency were 400 cycles instead of 380 cycles. Likewise when the frequency increases from nominal, for example to 420 cycles, the torque exerted by the element 8 is in the proper direction to urge the indicator shaft down scale to the position it would take if the line frequency was nominal.

Expressed mathematically, the torque $T_1$ developed in the torque element is:

$$T_1 = K_1 \theta (f - f_0)$$

where:
$\theta$ = rotation of indicator from zero.
$K_1$ = combined constant of torque element and frequency network.

The torque $T_2$ developed by the synchro receiver 7 may be expressed mathematically as:

$$T_2 = -K_2(\theta - \phi)$$

where:
$K_2$ = synchro receiver torque constant.
$\phi$ = angular rotation of synchro transmitter from zero.

The negative sign indicates that the receiver synchro is always urged to a null position. The equilibrium position to which the synchro receiver responds is that for which the torques $T_1$ and $T_2$ are in balance. At this position, and by equating $T_1$ and $T_2$ above:

$$\theta = \frac{K_2 \phi}{K_1 f + K_2 - K_1 f_0}$$

Through standard instrument techniques such as the magnetic strength adjustment of the torque element through adjustment of resistor 44, the characteristics of the system may be adjusted such that:

$$\frac{K_2}{K_1} = f_0$$

and $$\theta \frac{K_2 \phi}{K_1 f}$$

Therefore, the rotation of the indicator becomes proportional to mass flow rate and independent of frequency since $\phi$, the angular rotation of the synchro transmitter from zero, is proportional to mass rate of flow and frequency.

A direct current torque element can be used in place of the alternating current torque element 8. Direct current of proper magnitude and phase sensitivity or polarity $e_0$ can be derived from the compensating signal $e_f$ through a rectifying arrangement. This current can be converted to a frequency compensating torque in an arrangement such as that shown in FIGS. 7 and 8. Referring to FIGS. 7 and 8, the direct current torque element 8' includes a C-shaped permanent magnet 50 rigidly mounted on shaft 10 and oriented along the shaft such that the air gap 51 extends radially relative to shaft 10. Toroidal coil 52 passes through the gap 51 and surrounds the shaft 10 to provide clearance for deflection of the shaft and the permanent magnet 50. The toroidal coil 52 is non-uniformly or non-linearly wound upon core 53 so that the spacing between the adjacent turns decreases with the angular deflection in a clock-wise or increasing flow rate direction as indicated by arrow 54 from the zero flow rate position shown. The number of turns per inch and the resultant compensating torque produced by the interaction between the permanent magnet 50 and the magnetic field set up by the toroidal coil 52 is thus made proportional to the angular deflection of shaft 10 or the mass flow rate and also to the frequency deviation as represented by the current flow in coil 52.

Instead of altering the number of turns per inch of coil 52, the coil flux could be made proportional to mass flow rate by using a uniform spacing between turns with a core 53 that increases in diameter with angular deflection of the magnet 50, that is, in the direction of arrow 54. Since the torque produced is proportional to the coil diameter, the desired torque relationship to mass flow rate will be realized.

In order to insure that no compensating torque is developed at zero flow rates a portion of coil 52 may be omitted in the region of zero flow rate. Alternatively, a small section of coil 52 in the region between full scale and zero flow rate position can be wound in a reverse direction and shunted by a variable resistor to produce a selectively adjustable reverse torque on the magnet to enable an adjustment for zero torque at zero flow rate.

Figure 9:
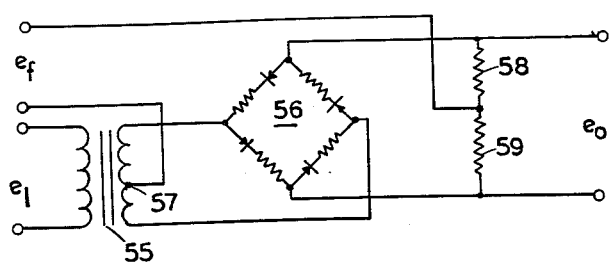
FIG. 9 is a schematic diagram of an alternating to direct current transducer for use with the torque element shown in FIGS. 7 and 8.

A linear voltage transducer, for the conversion of the alternating signal $e_f$ provided by the output of the frequency sensing network 12 to a direct current voltage suitable for use in torque element 8' is shown in FIG. 9. Referring to FIG. 9, the line voltage $e_1$ is coupled through transformer 55 to opposite junctions of rectifier bridge 56 while the output voltage is taken across the remaining junctions. The frequency compensating signal $e_f$ is applied between the center tap 57 of the secondary of transformer 55 and the junction between resistors 58 and 59 which shunt the output junctions of rectifier bridge 56. The output voltage $e_0$ which is the input to coil 52 of the torque element 8' provided by the diode switching or commutating action of the rectifier bridge 56 is a direct current voltage, the amplitude of which is proportional to the frequency deviation and the polarity of which is related to the direction of the frequency deviation signal from nominal.

Therefore, while particular embodiments of the subject invention have been shown and described herein, they are in the nature of description rather than limitation, and it will occur to those skilled in the art that various changes, modifications and combinations may be made within the province of the appended claims without departing either in spirit or scope from this invention in its broader aspects.

What we claim as new and desire to secure by Letters Patent of the United States is:

1. For use in a fluid mass rate of flow measuring apparatus of the type having a fluid mass rate of flow detector adapted to conduct the flowing fluid and including a source of A.-C. line voltage of a nominal frequency, fluid motive means energized by said source of A.-C. line voltage, the speed of said fluid motive means being proportional to the frequency of said A.-C. line voltage, and sensing means responsive to the product of mass rate of flow and speed of said motive means; an indicating arrangement including means to develop a first signal in accordance with the response of the sensing means, a first shaft, means to position said first shaft solely in response to said first signal, an indicator having a drive shaft, said first shaft being connected to position said drive shaft through a torsionally resilient coupling, an indicator compensator comprising, means to produce a second signal proportional to the magnitude and direction of the frequency deviation of said A.-C. line voltage from said nominal frequency, and magnetic torque means connected to said drive shaft independently of said resilient coupling to modify the position of said indicator drive shaft solely in response to said second signal and compensate the indicator for speed variations of said motive means which are due to frequency variations of said A.-C. line voltage, said torque means including a coil connected to be energized solely by said second signal producing means for developing a magnetic field in response to said second signal, at least a portion of said drive shaft being linked by said magnetic field.

2. For use in a fluid mass rate of flow measuring apparatus of the type having a fluid mass rate of flow detector adapted to conduct the flowing fluid and including a source of A.-C. line voltage of a nominal frequency, fluid motive means energized by said source of A.-C. line voltage, the speed of said fluid motive means being proportional to the frequency of said A.-C. line voltage, and sensing means responsive to the product of mass rate of flow and speed of said motive means; an indicating arrangement including means to develop a first signal in accordance with the response of the sensing means, a first shaft, means to position said first shaft solely in response to said first signal, an indicator having a drive shaft, said first shaft being connected to position said drive shaft through a torsionally resilient coupling, an indicator compensator comprising, means to produce a second signal proportional to the magnitude and direction of the frequency deviation of said A.-C. line voltage from said nominal frequency, and magnetic torque means connected to said drive shaft independently of said resilient coupling to modify the position of said indicator drive shaft solely in response to said second signal and compensate the indicator for speed variations of said motive means which are due to frequency variations of said A.-C. line voltage, said torque means including a coil connected to be energized solely by said second signal producing means for developing a magnetic field in response to said second signal, at least a portion of said drive shaft being linked by said magnetic field, the amount of linking flux produced by any given magnitude of said second signal varying in accordance with the position of said indicator drive shaft.

3. For use in a fluid mass rate of flow measuring apparatus of the type having a fluid mass rate of flow detector adapted to conduct the flowing fluid and including a source of A.-C. line voltage of a nominal frequency, fluid motive means energized by said source of A.-C. line voltage, the speed of said fluid motive means being proportional to the frequency of said A.-C. line voltage, and sensing means responsive to the product of mass rate of flow and speed of said motive means; an indicator arrangement including means to develop a first signal in accordance with the response of the sensing means, a first shaft, means to position said first shaft solely in response to said first signal, an indicator having a drive shaft, said first shaft being connected to position said drive shaft through a torsionally resilient coupling, an indicator compensator comprising, means to produce a second signal proportional in magnitude and phase to the magnitude and direction, respectively, of the frequency deviation of said A.-C. line voltage from said nominal frequency, and magnetic torque means connected to said drive shaft independently of said resilient coupling to modify the position of said indicator drive shaft solely in response to said second signal, said torque means including an electrically conductive disk connected to said drive shaft, and a coil connected to be energized solely by said second signal producing means to produce a magnetic field which links said conductive disk.

4. For use in a fluid mass rate of flow measuring apparatus of the type having a fluid mass rate of flow detector adapted to conduct the flowing fluid and including a source of A.-C. line voltage of a nominal frequency, fluid motive means energized by said source of A.-C. line voltage, the speed of said fluid motive means being proportioned to the frequency of said A.-C. line voltage, and sensing means responsive to the product of mass rate of flow and speed of said motive means; an indicating arrangement including means to develop a first signal in accordance with the response of the sensing means, means to position an indicator in accordance with said first signal, an indicator compensator comprising, means to produce a second signal proportional in magnitude and phase to the magnitude and direction, respectively, of the frequency deviation of said A.-C. line voltage from said nominal frequency, and magnetic torque means to modify the position of said indicator in response to said second signal, said torque means including an electrically conductive disk connected to said positioning means, a coil connected to be energized in accordance with said second signal to produce a first magnetic field, and a second coil connected to be energized by said source of A.-C. line voltage to produce a second magnetic field which links said first magnetic field to produce a resultant field which links said conductive disk to develop a torque thereon, and compensate the indicator for speed variations of said motive means which are due to frequency variations of said A.-C. line voltage.

5. For use in a fluid mass rate of flow measuring apparatus of the type having a fluid mass rate of flow detector adapted to conduct the flowing fluid and including a source of A.-C. line voltage of a nominal frequency, fluid motive means energized by said source of A.-C. line voltage, the speed of said fluid motive means being proprotioned to the frequency of said A.-C. line voltage, and sensing means responsive to the product of mass rate of flow and speed of said motive means; an indicating arrangement including means to develop a first signal in accordance with the response of the sensing means, means to position an indicator in accordance with said first signal, an indicator compensator comprising, means to produce a second signal proportional in magnitude and phase to the magnitude and direction, respectively, of the frequency deviation of said A.-C. line voltage from said nominal frequency, and magnetic torque means to modify the position of said indicator in response to said second signal, said torque means including an electrically conductive disk extending radially from said positioning means for deflection therewith, and a coil connected to be energized in accordance with said second signal to produce a first magnetic field, and a second coil connected to be energized by said source of A.-C. line voltage to produce a second magnetic field which links said first magnetic field to produce a resultant field which links said conductive disk to develop a torque thereon, and compensate the indicator for speed variations of said motive means which are due to frequency variations of said A.-C. line voltage, said second coil being wound about a core which is positioned radially to the axis of rotation of said disk, and said first coil being wound about a core which is positioned perpendicular to said second coil.

6. For use in a fluid mass rate of flow measuring apparatus of the type having a fluid mass rate of flow detector adapted to conduct the flowing fluid and including a source of a A.-C. line voltage of a nominal frequency, fluid motive means energized by said source of A.-C. line voltage, the speed of said fluid motive means being proportional to the frequency of said A.-C. line voltage, and sensing means responsive to the product of mass rate of flow and speed of said motive means; an indicating arrangement including means to develop a first signal in accordance with the response of the sensing means, means to remotely position an indicator in accordance with said first signal, an indicator compensator comprising, means to produce a second signal proportional in magnitude and phase to the magnitude and direction, respectively, the frequency deviation of said A.-C. line voltage from said nominal frequency, and magnetic torque means to modify the position of said indicator in response to said second signal, said torque means including an electrically conductive disk extending radially from said positioning means for deflection therewith, a first coil connected to be energized by said source of A.-C. line voltage, a pair of coils removed from said first coil, said pair of coils being connected in series and energized by said second signal, said coils being located such that the resultant of the magnetic fields produced upon energization thereof links said conductive disk to develop a torque thereon to compensate the indicator for speed variations of said motive means which are due to frequency variations of said A.-C. line voltage, and said disk being shaped so that the magnetic torque developed is proportional to the disk rotation.

7. For use in a fluid mass rate of flow measuring apparatus of the type having a fluid mass rate of flow detector adapted to conduct the flowing fluid and including a source of A.-C. line voltage of a nominal frequency, fluid motive means energized by said source of A.-C. line voltage, the speed of said fluid motive means being proportional to the frequency of said A.-C. line voltage, and sensing means responsive to the product of mass rate of flow and speed of said motive means; an indicating arrangement including means to develop a first signal in accordance with the response of the sensing means, means to remotely position the indicator in accordance with said first signal and including a resilient coupling between said positioning means and the indicator drive, an indicator compensator comprising, means to produce a second signal proportional in magnitude and phase to the magnitude and direction, respectively, of the frequency deviation of said A.-C. line voltage from said nominal frequency, and magnetic torque means coupled to said indicator drive to modify the position of said indicator in response to said second signal, said torque means including an electrically conductive disk connected to said drive for rotation therewith, a first coil connected to be energized by said source of A.-C. line voltage, a pair of coils removed from said first coil, said pair of coils being connected in series and energized by said second signal, said coils being located such that the resultant of the magnetic fields produced upon energization thereof links said conductive disk to develop a torque thereon to compensate the indicator for speed variations of said motive means which are due to frequency variations of said A.-C. line voltage, and said disk being shaped such that the magnetic torque developed is proportional to mass flow rate.

8. For use in a fluid mass rate of flow measuring apparatus of the type having a fluid mass rate of flow detector adapted to conduct the flowing fluid and including a source of A.-C. line voltage of a nominal frequency, motive means energized by said source of A.-C. line voltage, the speed of said fluid motive means being proportional to the frequency of said A.-C. line voltage, and sensing means responsive to the product of mass rate of flow and speed of said motive means, an indicating arrangement including means to develop a first signal in accordance with the response of the sensing means, a first shaft, means to position said first shaft solely in response to said first signal, an indicator having a drive shaft, said first shaft being connected to position said drive shaft through a torsionally resilient coupling, a compensator for variations of speed of said motive means which are due to frequency variations of said A.-C. line voltage comprising, means to produce a second electrical signal proportional in magnitude and phase to the magnitude and direction, respectively, of the frequency deviation of said A.-C. line voltage from said nominal frequency, and magnetic torque means connected to said drive shaft independently of said resilient coupling to modify the position of said indicator drive shaft solely in response to said second signal, said magnetic torque means including a first member of magnetic material and a second electromagnetic member connected to be energized solely by said second signal, one of said members being connected to said drive shaft to move in response to deflections of said indicator drive shaft and the other of said members being in a fixed position, the magnetic field produced by said electromagnetic member linking said first member.

9. For use in a fluid mass rate of flow measuring apparatus of the type having a fluid mass rate of flow detector adapted to conduct the flowing fluid and including a source of A.-C. line voltage of a nominal frequency, fluid motive means energized by said source of A.-C. line voltage, the speed of said fluid motive means being proportional to the frequency of said A.-C. line voltage, and sensing means responsive to the product of mass rate of flow and speed of said motive means; an indicating arrangement including means to develop a first signal in accordance with the response of the sensing means, means to remotely position an indicator in accordance with said first signal, an indicator compensator comprising, means to produce a second signal proportional in magnitude and phase to the magnitude and direction, respectively, of the frequency deviation of said A.-C. line voltage from said nominal frequency, and magnetic torque means to modify the position of said indicator in response to said second signal, said torque means including an electrically conductive disk connected to said positioning means for deflection therewith, a first coil connected to be energized by said source of A.-C. line voltage, a pair of coils removed from said first coil, said pair of coils being connected in series and energized by said second signal, and said coils being located such that the resultant of the magnetic fields produced upon energization thereof links said disk to develop a torque thereon to compensate the indicator for speed variations of said motive means which are due to frequency variations of said A.-C. line voltage, said pair of coils being connected such that the torque produced thereby from currents induced therein by said first coil cancel each other.

10. For use in a fluid mass rate of flow measuring apparatus of the type having a fluid mass rate of flow detector adapted to conduct the flowing fluid and including a source of A.-C. line voltage of a nominal frequency, fluid motive means energized by said source of A.-C. line voltage, the speed of said fluid motive means being proportional to the frequency of said A.-C. line voltage, and sensing means responsive to the product of mass rate of flow and speed of said motive means; an indicating arrangement including means to develop a first signal in accordance with the response of the sensing means, a first shaft, means to position said first shaft solely in response to said first signal, an indicator having a drive shaft for driving said indicator, said first shaft being connected to position said drive shaft through a torsionally resilient coupling, an indicator compensator comprising, means to produce a second signal proportional to the magnitude and direction of the frequency deviation of said A.-C. line voltage from said nominal frequency, and magnetic torque means connected to said drive shaft independently of said resilient coupling to modify the position of said indicator drive shaft solely in response to said second signal and compensate the indicator for speed variations of said motive means which are due to frequency variations of said A.-C. line voltage, said torque means including a coil connected to be energized solely by said second signal producing means for developing a magnetic field in response to said second signal, at least a portion of said drive shaft being linked by said magnetic field, the amount of linking flux produced by any given magnitude of said second signal varying in accordance with the position of said indicator drive shaft.

11. The combination of claim 10 in which said second signal producing means produces a direct current signal, and said portion of said drive shaft comprises a magnet which is linked by the magnetic field created by said coil.

12. The combination of claim 11 in which said magnet is a permanent magnet.

13. The combination of claim 12 in which said coil is stationary and surrounds said drive shaft in such a way that the magnitude of the field linking said permanent magnet, for any given value of signal applied to said coil, varies as the position of said drive shaft varies over the flow range of the system.

14. The combination of claim 13 in which said coil is toroidal in shape and has a nonlinear winding.

References Cited in the file of this patent

UNITED STATES PATENTS

| | | |
|---|---|---|
| 2,914,944 | Ballard | Dec. 1, 1959 |
| 2,914,945 | Cleveland | Dec. 1, 1959 |
| 2,975,634 | Rose | Mar. 21, 1961 |